US008681438B1

(12) United States Patent
Powers et al.

(10) Patent No.: US 8,681,438 B1
(45) Date of Patent: Mar. 25, 2014

(54) STORAGE MEDIA ASPERITY DETECTION

(71) Applicant: Seagate Technology LLC, Cupertino, CA (US)

(72) Inventors: Kevin David Powers, Longmont, CO (US); Sandeep Bhushan, Longmont, CO (US); James J. Martin, Longmont, CO (US); Prasanna Manja Ramakrishna, Englewood, CO (US); Dale Thomas Riley, Longmont, CO (US); Vance Charles Kluver, Longmont, CO (US); Scott Howard Deits, Littleton, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/627,763

(22) Filed: Sep. 26, 2012

(51) Int. Cl.
*G11B 5/02* (2006.01)
(52) U.S. Cl.
USPC ............................................................ 360/25
(58) Field of Classification Search
None
See application file for complete search history.

(56) References Cited

U.S. PATENT DOCUMENTS

| 5,768,055 | A | 6/1998 | Tian et al. |
| 5,991,113 | A | 11/1999 | Meyer et al. |
| 6,091,557 | A | 7/2000 | Hashizume |
| 6,104,557 | A * | 8/2000 | Kasai et al. ..................... 360/46 |
| 6,239,936 | B1 | 5/2001 | Abraham et al. |
| 6,307,719 | B1 * | 10/2001 | Mallary .................... 360/294.7 |
| 6,314,814 | B1 | 11/2001 | Brannon et al. |
| 6,504,662 | B2 | 1/2003 | Sobey |
| 7,583,467 | B2 | 9/2009 | Lee |
| 7,626,777 | B2 | 12/2009 | Aemireddy et al. |
| 7,742,255 | B2 | 6/2010 | Daugela et al. |
| 2002/0044369 | A1 * | 4/2002 | Schaenzer et al. .............. 360/25 |
| 2003/0030934 | A1 * | 2/2003 | Schaff et al. .................... 360/66 |
| 2004/0252392 | A1 | 12/2004 | Chua et al. |
| 2005/0105204 | A1 * | 5/2005 | Bloodworth et al. ........... 360/75 |
| 2006/0171057 | A1 | 8/2006 | Lee |
| 2008/0072692 | A1 | 3/2008 | Uji et al. |
| 2008/0192377 | A1 | 8/2008 | Lee |
| 2008/0225426 | A1 * | 9/2008 | Roy et al. ......................... 360/31 |
| 2008/0259483 | A1 * | 10/2008 | Biskeborn et al. .............. 360/55 |
| 2011/0235208 | A1 | 9/2011 | Yang |
| 2012/0120527 | A1 * | 5/2012 | Kunkel et al. .............. 360/235.4 |

* cited by examiner

*Primary Examiner* — Paul Huber
(74) *Attorney, Agent, or Firm* — HolzerIPLaw, PC

(57) ABSTRACT

The present application discloses a transducer head comprising a read element that reads data from a storage media and an asperity sensor that detects a dimension of an asperity on a surface of the storage media using a temperature change at the asperity sensor. The asperity may be one or both of a void in the surface of the storage media and a protrusion from the surface of the storage media.

20 Claims, 5 Drawing Sheets

View A

View B

STORAGE MEDIA ASPERITY DETECTION

BACKGROUND

Data storage media may include one or more surface asperities (e.g., protrusions and/or recesses), where protruding asperities have a potential to contact a transducer head flying in close proximity above the storage media while reading data from and writing data to the storage media. Contact with protruding surface asperities causes wear on the transducer head and reduces its useable life.

Efficient and effective systems and methods for detecting and characterizing surface asperities as protruding or recessed from the storage media surface are useful to reduce head-media contact events and prolong storage media and transducer head life.

SUMMARY

Implementations described and claimed herein address the foregoing problems by providing a transducer head comprising: a read element that reads data from a storage media; and an asperity sensor that detects a dimension of an asperity on a surface of the storage media using a temperature change at the asperity sensor.

Implementations described and claimed herein further address the foregoing problems by providing an asperity detection system comprising: a temperature-dependent resistive asperity sensor; and a preamplifier that correlates a resistance change at the asperity sensor to a dimension of an asperity on a surface of a storage media.

Implementations described and claimed herein still further address the foregoing problems by providing a method comprising: passing a transducer head over a storage media surface; and detecting a dimension of an asperity on the storage media surface using a temperature change at an asperity sensor on the transducer head, wherein the asperity sensor operates independently of a read element on the transducer head.

Other implementations are also described and recited herein.

BRIEF DESCRIPTIONS OF THE DRAWINGS

DETAILED DESCRIPTIONS

Figure 1:
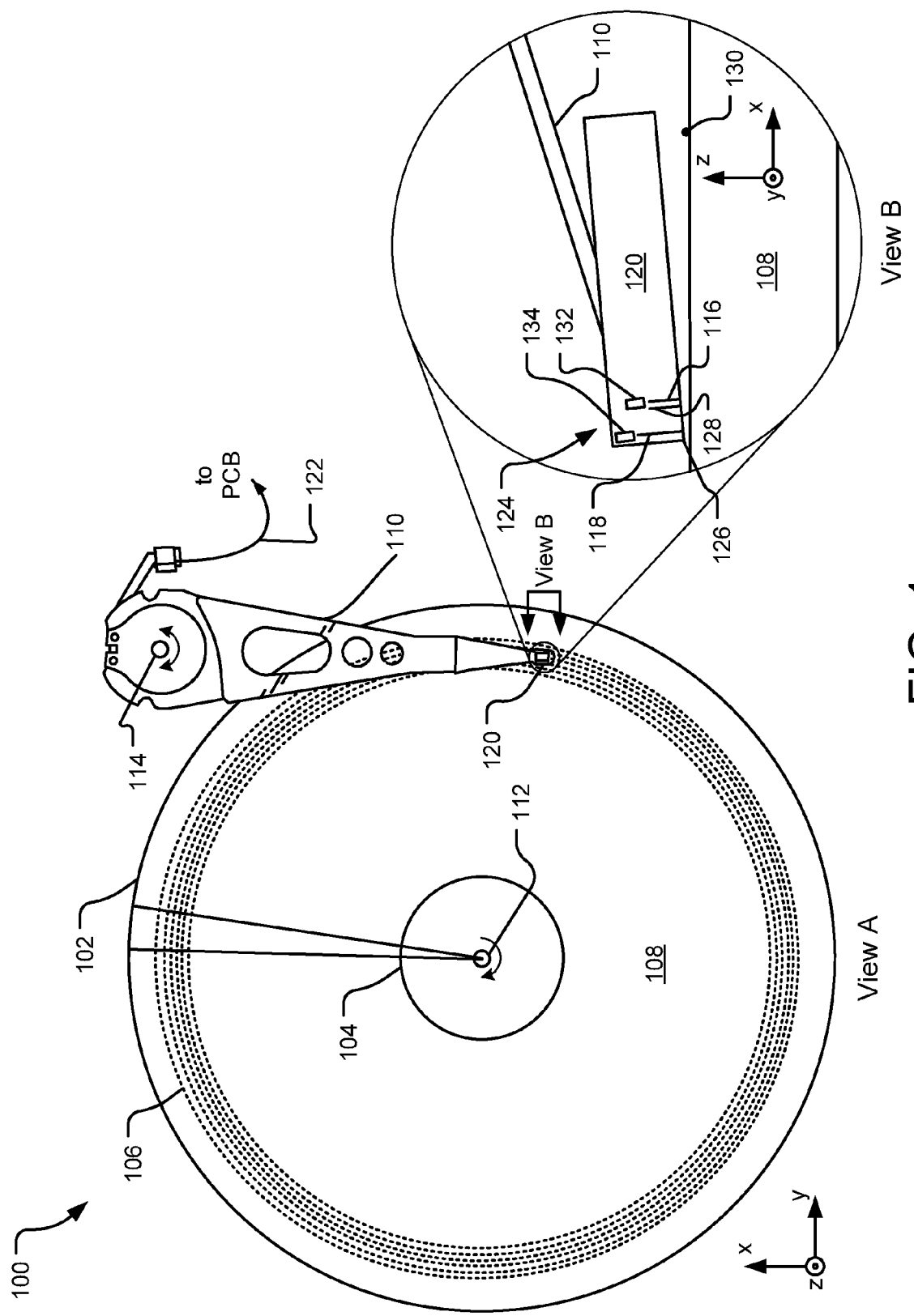
FIG. 1 illustrates an example disc drive assembly including an asperity sensor mounted on a slider located at a distal end of an actuator arm and positioned over a storage media disc.

FIG. 1 illustrates an example disc drive assembly 100 including an asperity sensor 128 created within a slider 120 located at a distal end of an actuator arm 110 and positioned over a storage media disc 108. Referring specifically to View A (x-y plane), the disc 108 includes an outer diameter 102 and an inner diameter 104 between which are a number of substantially circular data tracks (e.g., track 106) illustrated by circular dotted lines. In one implementation, the disc 108 rotates at a high speed about disc axis of rotation 112 as information is written to and read from the data tracks on the disc 108. Further, the disc rotation speed may be fixed or variable.

Information may be written to and read from the disc 108 through the use of an actuator arm 110. The actuator arm 110 rotates about an actuator axis of rotation 114 during a seek operation to located a desired data track and sector on the disc 108. Specific locations on the media disc 108 may defined by any available addressing scheme. Example schemes include cylinder-head-sector (CHS) addressing and logical block addressing (LBA) schemes. The actuator arm 110 extends toward the disc 108 and the slider 120 is located at the distal end of the actuator arm 110. The slider 120 flies in close proximity above the disc 108 while reading and writing data to the disc 108. In other implementations, there is more than one slider 120, actuator arm 110, and/or disc 108 in the disc drive assembly 100.

A flex cable 122 provides the requisite electrical connection paths from a printed circuit board (PCB, not shown) to electronic components attached to the slider 120 (e.g., a read element 116, a write element 118, and the asperity sensor 128) while allowing pivotal movement of the actuator arm 110 during operation. The flex cable 122 may be routed along the actuator arm 110 from the PCB to the slider 120. The PCB may include circuitry (e.g., a preamplifier (preamp)) for controlling the write currents applied to the write element 118 during a write operation, amplifying read signals generated by the read element 116 during a read operation, and providing asperity detection using the asperity sensor 128, for example. See FIG. 2 for details regarding the preamp.

A side view of the slider 120 is shown in detail in View B of the x-z plane of FIG. 1 and includes the read element 116 and a corresponding read element heater 132, the write element 118 and a corresponding write element heater 134, and the asperity sensor 128, all of which are located near a trailing edge 126 of the slider 120. Other microelectronic components may also be mounted near the trailing edge 126 or on other areas of the slider 120. The appearances of the slider 120 and other features of assembly 100 are for illustration purposes only and not drawn to scale. The various microelectronic components attached to the slider 120 may be referred to in total as a transducer head 124.

The disc 108 has a multitude of independent magnetic domains embedded within the disc 108 and the disc 108 generally moves in the negative x-direction with respect to the transducer head 124 in View B. The read element 116 is magneto resistive (i.e., it has a resistance value that varies with magnetic polarity of the magnetic domains of the underlying disc 108 as they pass underneath the read element 116), which allows the read element 116 to read data from the underlying disc 108. The write element 118 generates a magnetic field that changes the magnetic polarity of the magnetic domains of the underlying disc 108 as they pass underneath the write element 118. This allows the write element 118 to write data to the underlying disc 108.

While various efforts are typically made to make the disc 108 as smooth as possible, disc surface irregularities are inevitable at some scale. Here, an asperity 130 protrudes upward from the disc 108 surface. If the asperity 130 height is greater than the fly height of the protruding read element 116, write element 118, or other component of the transducer head 124, the asperity 130 may contact the transducer head 124 and cause damage or wear on the transducer head 124. This contact is to be avoided by use of the asperity sensor 128 to detect the presence, location and scale of protruding asperities like asperity 130 on the disc 108 surface.

Asperities are referred to herein as any variations from a planar surface of the disc 108. These variations include defects (e.g., sputtering anomalies) in the disc 108 surface and contaminates located on the disc 108 surface. The Asperities include protruding asperities (e.g., the asperity 130), recessed asperities (e.g., the void 344 of FIG. 3), or an area of increased surface roughness (e.g., rapidly changed protrusions and recessions inconsistent with typical surface roughness of the disc 108).

The asperity sensor 128 is made of a material with a resistance that significantly varies with temperature (i.e., a TCR material). In various implementations, the asperity sensor 128 is made of NiFe, Ni, or Cr and has a temperature coefficient of resistance (TCR) of at least 0.002% per degree Celsius. Further, the asperity sensor 128 may be at least two tracks wide and large enough to provide a detectable voltage response that varies with temperature of the asperity sensor 128. Still further, the asperity sensor 128 may have a distinct material composition from the read element 116 and/or the write element 118.

Since cooling/heating effects on the transducer head 124 vary significantly depending on fly height, sudden changes in fly height (e.g., changes caused by the proximity of asperity 130 to the transducer head 124) causes the asperity sensor 128 temperature to increase or decrease from a steady state operating temperature of the asperity sensor 128. Since the asperity sensor 128 has a resistance that significantly varies with temperature, a change in the resistance of the asperity sensor 128 indicates the presence and one or more spatial dimensions of the asperity 130. See discussion below for details regarding use of the asperity sensor 128 to determine particular spatial dimensions of the asperity 130.

The read element heater 132 varies a distance the read element 116 protrudes from the slider 120 toward the disc 108 to fine tune a clearance between the read element 116 and the disc 108. Similarly, the write element heater 134 varies a distance the write element 118 protrudes from the slider 120 toward the disc 108 to fine tune a clearance between the write element 118 and the disc 108. In the implementation depicted in FIG. 1, the asperity sensor 128 is located physically closer to the read element 116 and the corresponding read element heater 132 than the write element 118 and the corresponding write element heater 134. As a result, the read element heater 132 is also used to fine tune a clearance between the asperity sensor 128 and the disc 108.

In other implementations, the asperity sensor 128 may be located closer to the write element heater 134 and the write element heater 134 may be used to fine tune the clearance between the asperity sensor 128 and the disc 108. In yet other implementations, the asperity sensor 128 may have a dedicated heater that fine tunes the clearance between the asperity sensor 128 and the disc 108.

The presently disclosed technology may apply to storage drive assemblies other than the disc drive assembly 100 depicted in FIG. 1. Further, the presently disclosed technology may be used to detect asperities on planar surfaces other than storage media.

Figure 2:
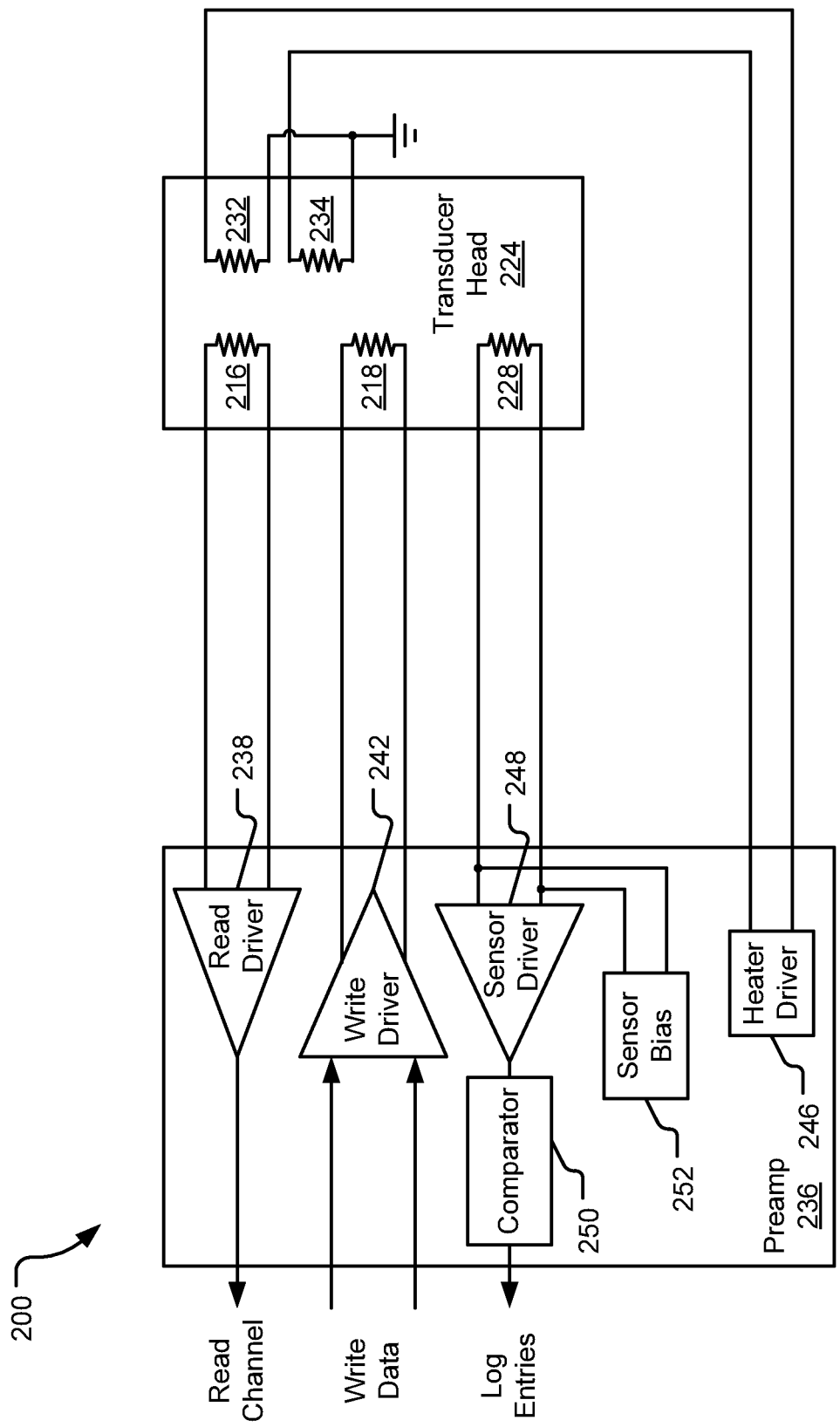
FIG. 2 illustrates an example circuit diagram for an asperity detection system.

FIG. 2 illustrates an example circuit diagram for an asperity detection system 200. The system 200 includes a transducer head 224 and a preamp 236. The transducer head 224 includes a read element 216 and a corresponding read element heater 232, a write element 218 and a corresponding write element heater 234, and an asperity sensor 228. The transducer head 224 flies in close proximity above a storage media surface (not shown) as data is read from the storage media using the read element 216, as data is written to the storage media using the write element 218, and as one or more asperities on the storage media surface are detected using the asperity sensor 228.

The preamplifier 236 includes a read driver 238, a write driver 242, and a heater driver 246. The read driver 238 processes a read signal received from the read element 216 and sends the read signal out to a read channel. The write driver 238 processes incoming write data that is then sent to the write element 218 for inclusion on the storage media. The heater driver 246 sends power to one or both of the read element heater 232 and the write element heater 234 to fine tune the fly height of the read element 216, the write element 218 and/or the asperity sensor 228.

The preamp 236 further includes a sensor bias generator 252, a sensor driver 248, and a sensor comparator 250. Cooling/heating effects on the transducer head 224 vary significantly depending on fly height, sudden changes in fly height (e.g., changes caused by the proximity of an asperity to the transducer head 224) causes the asperity sensor 228 to heat or cool depending on whether the asperity protrudes or is recessed from the storage media surface. Since the asperity sensor 228 is made of a material with a resistance that significantly varies with temperature, a change in the resistance of the asperity sensor 228 indicates the presence and one or more dimensions of an asperity and whether the asperity protrudes or is recessed from the storage media surface.

The sensor bias generator 252 applies a bias voltage across the asperity sensor 228 to detect changes in resistive value of the asperity sensor 228 in terms of a differential voltage change. The sensor driver 248 receives the biased voltage change across the asperity sensor 228 and outputs a voltage/time waveform with variations in voltage that correspond to changes in resistance of the asperity sensor 228. Further, the sensor driver 248 may condition the output voltage waveform by applying a gain factor to boost the output signal and/or applying a band-pass filter to filter out noise in the output voltage/time waveform that does not correspond to changes in resistance of the asperity sensor 228. In one implementation, the gain factor ranges from approximately 25 to 48 decibels and the band pass filter ranges from 500 kHz to 2 MHz.

The conditioned output voltage waveform is output to a comparator 250, which compares the voltage of the waveform to one or more thresholds, where exceeding the threshold indicates the presence of an asperity and the polarity of the response indicates the type of asperity detected (e.g., a protrusion or a void). Material composition of the storage media, media lube (not shown), media velocity, and fly height all influence the response of the asperity sensor 228. Baseline noise is a positive voltage setting and a negative voltage setting at the sensor comparator 250 that continually exceeds background noise using bias voltage, gain, and/or filter settings applied by the sensor bias generator 252, the sensor driver 248, and/or the sensor comparator 250. The filter settings, gain factors, and/or detection thresholds for the asperity sensor 228 may be calibrated during commissioning of a storage drive to account for storage drive baseline noise specific to a particular installation of the asperity sensor 228.

When the comparator 250 detects the presence of an asperity, a signal is output indicating the presence and one or more detected dimensions of the asperity. The location on the storage media and heater power output when the asperity was detected is recorded in a log.

The logged comparator 250 output may be further analyzed to pinpoint the position, one or more dimensions, and whether detected asperity protrudes from or is recessed within the storage media. In an example implementation, height of a protruding asperity is determined by looping through a series of transducer head fly heights (e.g., ranging from a maximum fly height to target read clearance) using a voltage threshold above baseline noise. The height of the asperity corresponds to the maximum fly height where the asperity is detected. Further, width of the asperity may be defined as the number of adjacent tracks where the asperity is detected. Still further, length of the asperity may be defined as the number of consecutive read symbols along a data track where the asperity is detected.

Figure 3:
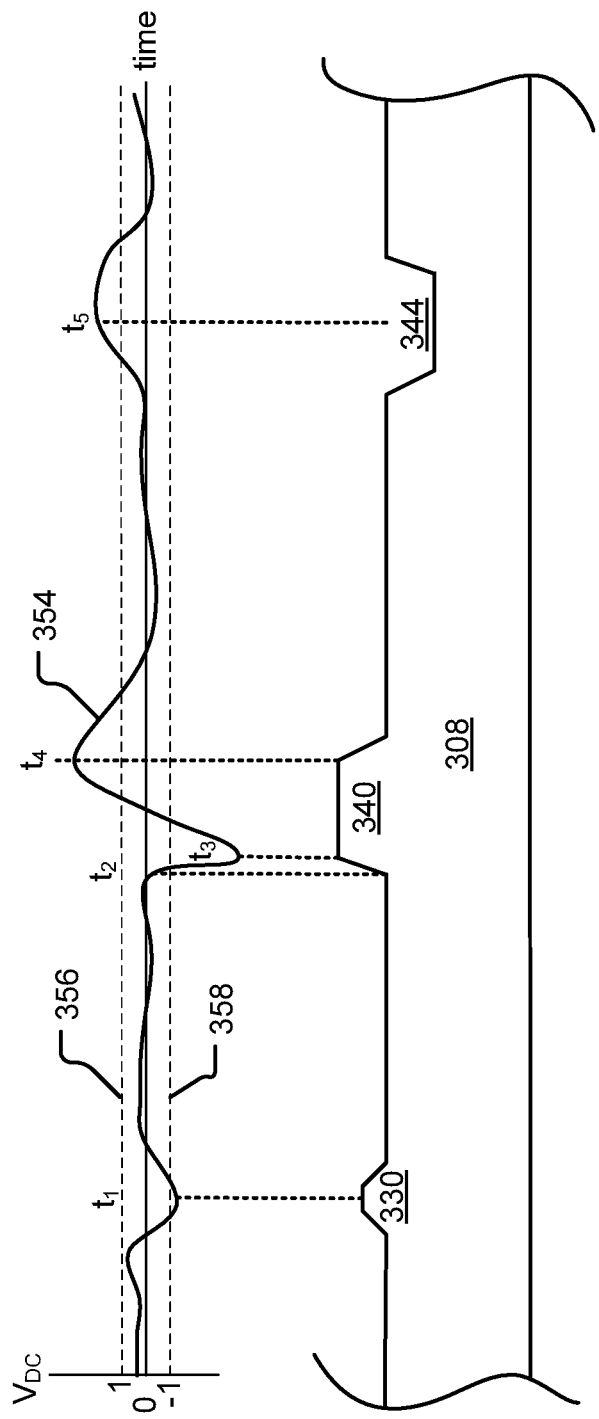
FIG. 3 illustrates a voltage response of an example asperity sensor as the asperity sensor passes over three asperities on a storage media surface.

FIG. 3 illustrates a voltage response 354 of an example asperity sensor (not shown) as the asperity sensor passes over three asperities 330, 340, 344 on a storage media 308 surface. The voltage response 354 is a plot of AC-coupled differential voltage across the asperity sensor, which corresponds to temperature changes at the asperity sensor over time. More specifically, as temperature drops at the asperity sensor, the resistance of the asperity sensor drops, and thus the differential voltage across the asperity sensor increases with a negative polarity. Similarly, as the temperature rises at the asperity sensor, the resistance of the asperity sensor rises, and thus the differential voltage across the asperity sensor increases with a positive polarity.

In some implementations, the voltage response 354 is normalized, amplified, and/or filtered (see e.g., sensor driver 248 of FIG. 2) to emphasize voltage changes that correspond to temperature changes at the asperity sensor over time. In the implementation shown in FIG. 3, the voltage response 354 is normalized to approximately 0 volts when no asperities are present. In other implementations, the voltage response 354 may be normalized to any convenient magnitude with a positive or negative polarity. A positive threshold 356 is set at 1 volt and a negative threshold 358 is set at −1 volt to indicate the presence of an asperity. Variations in the voltage response 354 that do not exceed the thresholds 356, 358 indicate baseline noise or asperities with small enough dimensions that they are ignored. The thresholds 356, 358 may be set at any value and may be adjusted in real time to calibrate the minimum size of detected asperities. For example, the thresholds 356, 358 may be set at a value that detects asperities that protrude greater than 6 nm from the storage media 308 surface. In one implementation, the preamp is capable of detecting voltages ranging from 1-200 mV. Thus, the thresholds 356, 358 may be set at magnitudes less than +200 mV and −200 mV when using such a preamp.

The storage media 308 surface includes three asperities 330, 340, 344 that correspond to changes in the voltage response 354. The sizes and appearances of the storage media 308 surface and the asperities 330, 340, 344 are for illustration purposes only and not drawn to scale.

The asperity 330 represents a small protruding asperity that is sufficiently tall to affect the temperature of the asperity sensor, but insufficiently tall to physically impact the asperity sensor at a given fly height. As the asperity sensor flies over the asperity 330, the effective clearance between the asperity sensor and the storage media 308 surface is reduced, which increases speed of air or other cooling fluid flowing between the asperity sensor and the storage media 308 surface. The increased cooling fluid speed increases convective cooling of the asperity sensor, which causes a drop in the voltage response 354 (shown at approximately time=$t_1$). As the asperity sensor moves away from the asperity 330, the voltage response 354 returns to zero or near zero. Since the magnitude of the drop in the voltage response 354 exceeds the threshold 358, the asperity 330 is detected. The presence of the asperity 330, magnitude and polarity of the voltage response, and its location on the storage media 308 is recorded in a table for later use.

Further, a number of consecutive symbols counted where the thresholds 356, 358 are exceeded in the voltage response 354 may define a down-track dimension of the asperity 330. In one implementation, the number of consecutive symbols that exceed the thresholds 356, 358 is detected using a read element simultaneously with the asperity sensor. The asperity sensor indicates the start of a protruding asperity and the number of consecutive symbols in error detected by the read element defines the down-track dimension of the asperity 330.

The asperity 340 represents a larger protruding asperity (e.g., greater than 6 nm tall) that is both sufficiently tall to affect the temperature of the asperity sensor and physically impact the asperity sensor at a given fly height. As the asperity sensor approaches the asperity 340, the effective clearance between the asperity sensor and the storage media 308 surface is reduced, which increases speed of air or other cooling fluid flowing between the asperity sensor and the storage media 308 surface. The increased cooling fluid speed increases convective cooling of the asperity sensor, which initially causes a drop in the voltage response 354 (shown approximately between times $t_2$ and $t_3$). However, when the effective clearance between the asperity sensor and the storage media 308 surface reaches zero and the asperity sensor is in contact with the asperity 340, the flow of cooling fluid between the asperity sensor and the storage media 308 surface drops to zero or near zero and the contact causes frictional and/or conductive heating of the asperity sensor. This causes the voltage response 354 to rapidly rise (shown approximately between times $t_3$ and $t_4$). As the asperity sensor moves away from the asperity 340 (shown approximately after time $t_4$), the voltage response 354 returns to zero or near zero.

Since the magnitude of the drop in the voltage response 354 exceeds the threshold 358, the asperity 340 is detected. Further, the immediate increase in the voltage response 354 that exceeds the threshold 356 indicates that the asperity 340 contacted the asperity sensor. The presence of the asperity 340, the magnitude and polarity of the voltage response, and its location on the storage media 308 is recorded in a table for later use. Further, a number of consecutive symbols that exceed the thresholds 356, 358 in the voltage response 354 may define a down-track dimension of the asperity 340.

In one implementation, when the voltage response exceeds both of the thresholds 356, 358 in short succession, a dominant response defines whether the detected asperity is a void or a protrusion. For example, since the magnitude of the drop in voltage response 354 at time $t_3$ is greater than the rise in the voltage response 354 at time $t_4$, the asperity 340 is characterized as a protruding asperity rather than a void asperity.

The asperity 344 is a void sufficiently deep to affect the temperature of the asperity sensor. As the asperity sensor flies over the asperity 344, the effective clearance between the asperity sensor and the storage media 308 surface increases, which decreases the speed of air or other cooling fluid flowing between the asperity sensor and the storage media 308 surface. The decreased cooling fluid speed decreases convective cooling of the asperity sensor, which causes a rise in the voltage response 354 (shown at approximately time=$t_5$). As the asperity sensor moves away from the asperity 344, the voltage response 354 returns to zero or near zero. Since the magnitude of the rise in the voltage response 354 exceeds the threshold 356, the asperity 344 is detected. The presence of the asperity 344, magnitude and polarity of the voltage response, and its location on the storage media 308 is recorded in a table for later use. Further, a number of consecutive symbols that exceed the thresholds 356, 358 in the voltage response 354 may define a down-track dimension of the asperity 344.

In another example implementation, the voltage response 354 ranges from about 1.2V to −0.6V. Further, the thresholds 356, 358 are set at about 0.2V and −0.1V. Still further, an asperity may be detected within about a $2.0 \times 10^{-7}$ second range of the voltage response 354. Other variations of the voltage response 354 are contemplated herein.

Figure 4:
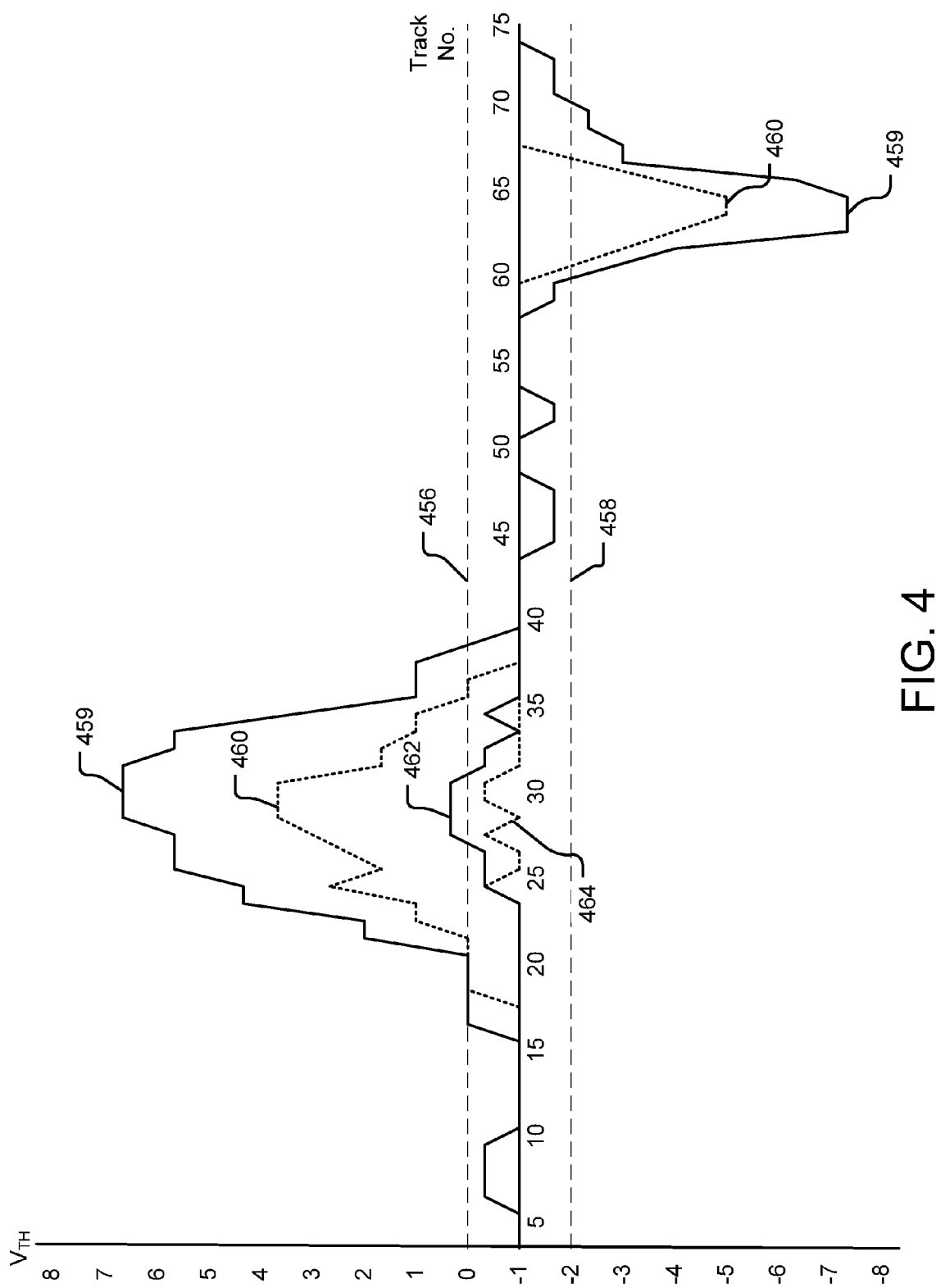
FIG. 4 illustrates four cross-track voltage profiles of an example asperity sensor as the asperity sensor passes over a media surface at a variety of fly heights.

FIG. 4 illustrates four cross-track voltage profiles 459, 460, 462, 464 of an example asperity sensor as the asperity sensor passes over a media surface at a variety of fly heights. The voltage profiles 459, 460, 462, 464 are plots of threshold voltage that corresponds to voltage measured across the asperity sensor as a function of cross-track position of the asperity sensor. As temperature rises at the asperity sensor, the resistance of the asperity sensor drops, and thus the threshold voltage across the asperity sensor increases with a negative polarity. Similarly, as the temperature drops at the asperity sensor, the resistance of the asperity sensor rises, and thus the differential voltage across the asperity sensor increases with a positive polarity (or increases from −1 to 0 volts).

The cross-track voltage profiles 459, 460, 462, 464 may be constructed from digital data from a plurality of voltage responses collected and stored when passing the asperity sensor over the surface in a down-track direction (see e.g., voltage response 354 of FIG. 3). In one implementation, the cross-track voltage profiles 459, 460, 462, 464 each illustrate asperities and voids of tracks 5-70 within a selected geometric sector or radius of a circular media. The cross-track voltage profiles 459, 460, 462, 464 vary by fly-height of the asperity sensor over the media surface. Tracks 5-70 are selected for illustration purposes, but any larger or smaller grouping of tracks may be used to construct a cross-track voltage profile. Further, more voltage profiles may be used to characterize dimensions of an asperity (e.g., voltage profiles corresponding to each of 15, 25, 35, 45, 55, 65, 75, 85, and 95 angstrom fly heights).

In some implementations, stored digital data from a plurality of voltage responses collected and stored when passing the asperity sensor over the surface in a down-track direction is digital-to-analog converted to construct the depicted voltage profiles 459, 460, 462, 464. Further, the voltage profiles 459, 460, 462, 464 may be normalized, amplified, and/or filtered (see e.g., sensor driver 248 of FIG. 2) to emphasize voltage changes that correspond to temperature changes at the asperity sensor over time and deemphasize baseline noise. In the implementation shown in FIG. 4, the voltage profiles 459, 460, 462, 464 are normalized to approximately −1 volts when no asperities or voids are present. Voltages greater than −1 volts indicate the presence of a void and voltages less than −1 volts indicate the presence of an asperity. The magnitude of the negative polarity voltage indicates the height of a protruding asperity. In other implementations, the voltage profiles 459, 460, 462, 464 may be normalized to any convenient positive to negative voltage magnitude. Further, a positive threshold 456 is set at 0 volts and a negative threshold 458 is set at −2 volts to indicate the presence of an asperity. Variations in the voltage profiles 459, 460, 462, 464 that do not exceed the thresholds 456, 458 indicate baseline noise or asperities with small enough dimensions that they are ignored. The thresholds 456, 458 may be set at any value and may be adjusted in real time to calibrate the minimum size of detected asperities.

The voltage profile 459 is constructed from a plurality of voltage responses collected and stored when passing the asperity sensor over the surface in a down-track direction at a minimum fly height (e.g., 15 angstroms). The voltage profile 459 indicates a small void asperity or noise artifact is located between approximately tracks 5 and 10. Since this asperity or noise artifact is below the void threshold of 0 volts, it is ignored. Further, the voltage profile 459 indicates a larger void asperity is located between approximately tracks 15 and 40, which is a cross-track dimension of the void. The profile 459 peaks at about 6.5 volts, which approximately corresponds to a center of the void at approximately track 30.

Still further, the voltage profile 459 indicates two small protruding asperities or noise artifacts are located approximately between tracks 43 and 48 and between tracks 51 and 54. Since these asperities or noise artifacts are above the asperity threshold of −2 volts, they are ignored. Further yet, the voltage profile 459 indicates a large protruding asperity is located between approximately tracks 57 and 75, which is a cross-track dimension of the asperity. The profile 459 peaks at about −7.5 volts, which approximately corresponds to a peak height of the asperity at approximately track 65.

The voltage profile 460 is constructed from a plurality of voltage responses collected and stored when passing the asperity sensor over the surface at a greater fly height than that which corresponds to the voltage profile 459 (e.g., 30 angstroms). The small asperity or noise artifact located between approximately tracks 5 and 10 is no longer detected with the asperity sensor fly height of voltage profile 460. The large void asperity located between approximately tracks 15 and 40 is still detected, but with a reduced peak voltage at about 3.5 volts and a reduced cross-track dimension between approximately tracks 17 and 37.

The two small asperities or noise artifacts located approximately between tracks 43 and 48 and between tracks 51 and 54 are also no longer detected with the asperity sensor fly height of voltage profile 460. The large protruding asperity located between approximately tracks 57 and 75 is still detected, but with a reduced peak voltage at about −5 volts and a reduced cross-track dimension between approximately tracks 60 and 67.

The voltage profile 462 is constructed from a plurality of voltage responses collected and stored when passing the asperity sensor over the surface at a greater fly height than that which corresponds to the voltage profile 460 (e.g., 60 angstroms). The large void asperity located between approximately tracks 15 and 40 is still detected, but with a reduced peak voltage at about 0.2 volts and a reduced cross-track dimension between approximately tracks 24 and 35. The large protruding asperity located between approximately tracks 57 and 75 is no longer detected with the asperity sensor fly height of voltage profile 462. Since the large asperity located between approximately tracks 57 and 75 was detected at a fly height of 30 angstroms (see voltage profile 460) and no longer detected at a fly height of 60 angstroms (see voltage profile 462), a height dimension of the large asperity is approximately 30 angstroms.

The voltage profile 464 is constructed from a plurality of voltage responses collected and stored when passing the asperity sensor over the surface at a greater fly height than that which corresponds to the voltage profile 462 (e.g., 100 angstroms). In one implementation, the fly height represented by voltage profile 464 is the maximum fly height of a transducer head (i.e., heater power is off). The large void asperity located between approximately tracks 15 and 40 is still detected, but with a reduced peak voltage at about −0.2 volts. Since this voltage is below the void threshold of 0 volts, the large void asperity is ignored when the head is at a fly height equal to or greater than 100 angstroms.

A down-track dimension of each detected asperity may be determined from voltage responses collected and stored when passing the asperity sensor over the surface in a down-track direction (see e.g., voltage response 354 of FIG. 3). A cross-track dimension of each asperity may be determined from a grouping of voltage profiles corresponding to a grouping of tracks (e.g., voltage profiles 459, 460, 462, 464 for tracks 5-75). A height dimension of each protruding asperity may be determined from a grouping of voltage profiles that vary by fly height (e.g., voltage profiles 459, 460, 462, 464 for fly heights of 15, 30, 60, and 100 angstroms, respectively).

Figure 5:
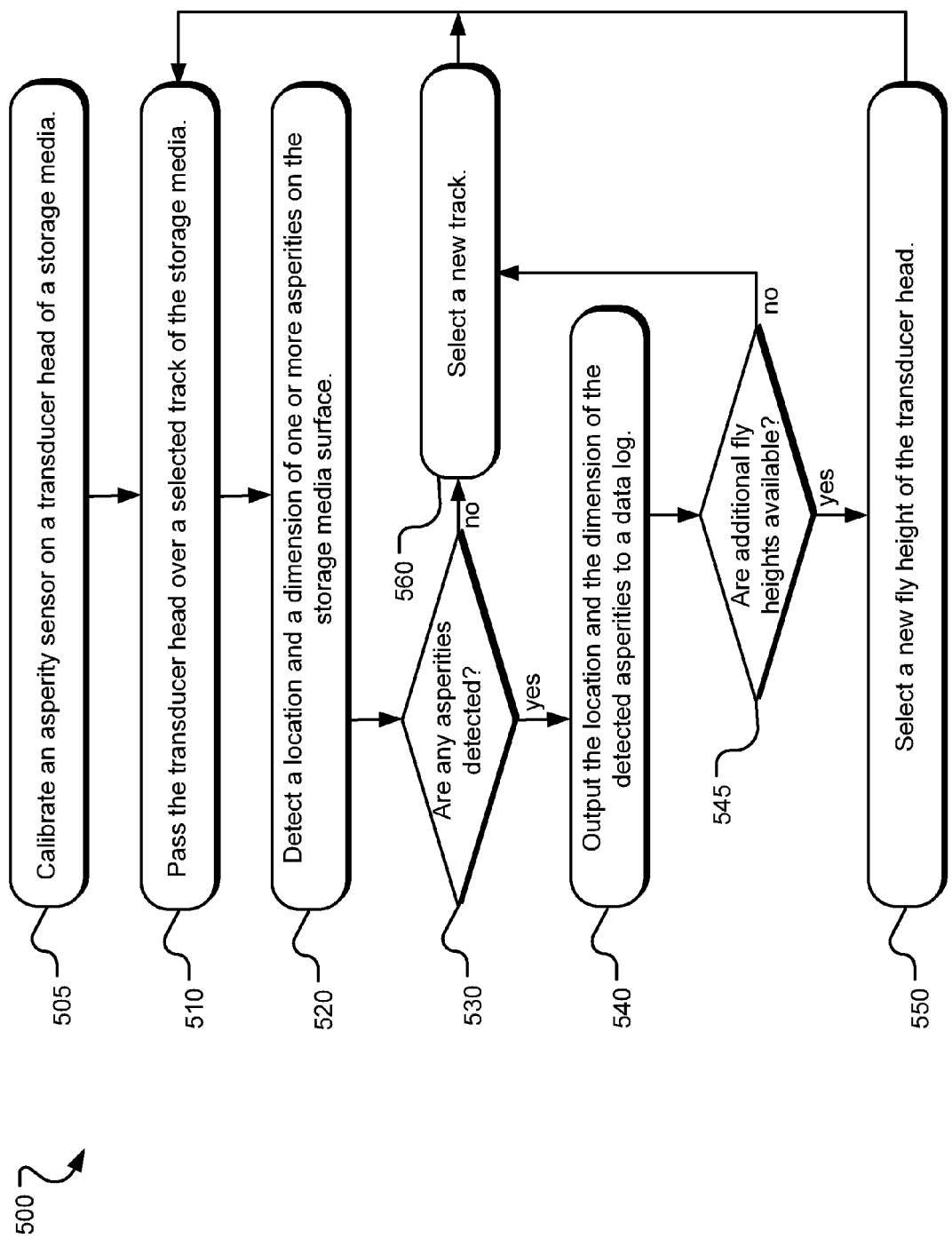
FIG. 5 illustrates example operations for detecting and determining one or more dimensions of asperities on a storage media surface.

FIG. 5 illustrates example operations 500 for detecting and determining one or more dimensions of asperities on a storage media surface. A calibration operation 505 calibrates an asperity sensor on a transducer head associated with the storage media. The calibration operation 505 may include adjusting one or more of bias voltage, gain, and filter settings to account for baseline noise while providing effective detection of asperities on the storage media surface. In one implementation, baseline noise is calibrated at a variety of radial positions and frequency zones of the storage media by counting faults (i.e., events where a differential voltage across the asperity sensor exceeds a positive and/or a negative threshold) at each radial position and frequency zone. The positive and negative voltage thresholds are increased until faulting is reduced to a low level or eliminated altogether. Further, a fixed offset voltage may be applied to the differential voltage across the asperity sensor to minimize false detections of asperities. The fixed offset voltage is used as a threshold for detecting asperities.

A passing operation 510 passes the transducer head over a selected track of the storage media. During the passing operation 510, the transducer head operates within a frequency zone associated with the selected track. In disc storage media, the track is one of many concentric circular tracks on the storage media. The transducer head flies in close proximity to the media surface as it passes over the selected track. The height of the transducer head as it flies above the media surface is referred to herein as fly height. In some implementations, more than one frequency zone is associated with the selected track and the passing operation 510 is performed using each frequency zone associated with the selected track.

A detecting operation 520 detects a location and a dimension of one or more asperities on the storage media surface. An asperity causes a change in relative fly height of the transducer head, which causes a change in convective cooling characteristics of the transducer head. More specifically, increased fly height decreases convective cooling and decreased fly height increases convective cooling. Further, if an asperity protrudes from the media surface a distance that exceeds the fly height, the asperity impacts and heats the transducer head through conduction and/or frictional forces.

The transducer head includes an asperity sensor, which detects the asperities by monitoring a change in temperature in the transducer head. Changes in temperature are related to a change in resistance of the asperity sensor. A voltage is applied to the asperity sensor and changes in voltage across the asperity sensor indicate the presence of an asperity. In some implementations, the detecting operation 520 is performed in a single pass over the selected track in the passing operation 510.

In one implementation, the detecting operation 520 is performed by using a negative threshold of the asperity sensor only (i.e., detecting cooling events only). Cooling events indicate passing over a small asperity that does not contact the transducer head or the approach of a large protruding asperity prior to contact with the transducer head, which is a heating event. Therefore, detecting cooling events provides complete detection of protruding asperities. Then, cooling events that are rapidly followed by a heating event are characterized as either protruding asperities or void asperities (e.g., by determining whether the heating or cooling event is dominant and characterizing the asperities according to the dominant response).

A decision operation 530 determines if any asperities are detected on the selected track. One or more voltage thresholds may be applied to a read-back voltage profile from the asperity sensor in decision operation 530. If and where the threshold(s) are exceeded, an asperity is detected. If one or more asperities are detected, an outputting operation 540 outputs the location and a dimension of the asperity to a system-level data log. For example, the outputting operation 540 may indicate one or more track sectors where an asperity is detected. Further, a number of consecutive track sectors where an asperity is detected provides a down-track dimension of the asperity. The outputting operation 540 may also define a location of the asperity by head, track, servo wedge, and position from index.

Each of the track, servo wedge, and position from index may include a range that provides a dimension of the asperity. Further, ranges of track, servo wedge, and position from index that indicate an asperity that spans multiple tracks and servo wedges may be grouped with a unique identifier, noting start and end locations of the asperity and a number and polarity of detected errors within the grouped range.

Still further, there may be an offset between the detected location of the asperity and the location of the read element and/or write element (whichever is calculated to be the closest point to the media during normal media operation) on the transducer head. This offset is caused by an distance between the asperity sensor and the read element and/or write element within the transducer head. Further, the offset between the detected location of the asperity and the location of the read element and/or write element may vary depending on a skew of an arm associated with the transducer head and the storage media itself (e.g., this effect may be most pronounced at innermost and/or outermost locations on the storage media). Since this is a fixed geometric effect, an offset factor may be included to relate the detected location of the asperity to the actual location of the read element and/or write element, depending on the skew of the arm associated with the transducer head and the storage media at the currently selected track.

A decision operation 545 determines if any additional fly heights are available on the selected track. If so, a selection operation 550 selects a new fly height of the transducer head. In one implementation, the selection operation 550 is accomplished by changing a power output to one or more heaters within the transducer head, which control a distance that microelectronic structures (e.g., a read element and a write element) within the transducer head protrude toward the storage media. Operations 510, 520, 530, 540, 545, and 550 are iteratively repeated until no asperities are detected in decision operation 530 or no additional fly heights are available as determined by decision operation 545. In various implementations, the changing operation 550 progressively increases or decreases the fly height with each iteration. In one implementation, the minimum fly height where an asperity is no longer detected provides a height dimension of the asperity. If an asperity is still detected at the highest fly height, the asperity will always be in contact with the head in that location and the outputting operation 540 location logs the location as such and that location is avoided during regular operation of the storage media operation.

If no asperities are detected in decision operation 530 or no additional fly heights are available as determined by decision operation 545, selecting operation 560 selects a new track for performing operations 510, 520, 530, 540, and 550. Operations 500 may be repeated iteratively until all tracks are used.

Operations 500 may be performed once to map asperities on the media surface in order to select or avoid regions of the media for reading/writing data and/or to set fly the height of the transducer head. In some implementation, operations 500 may be performed periodically to detect any changes in asperities on the media surface.

Further, media locations that are determined to contain a protruding asperity with a height that may impact the transducer head, as discussed in detail above, are padded from the transducer head. This is accomplished by disabling one or more transducer head heaters when moving over the protruding asperity to move over the protruding asperity at a maximum fly height. Further, media locations adjacent to a protruding asperity may also be padded or spared from use to minimize the potential for contact between the protruding asperity and the transducer head. Sparing media locations adjacent to a protruding asperity from use prevents modulation during media writing, but does not require that the heater (s) be disabled in those locations.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A transducer head comprising:
   a read element that reads data from a storage media; and
   an asperity sensor that detects a dimension of an asperity on a surface of the storage media using a temperature change at the asperity sensor, the temperature change caused by convective heat transfer.

2. The transducer head of claim 1, wherein the asperity includes one or both of a void in the surface of the storage media and a protrusion from the surface of the storage media.

3. The transducer head of claim 1, wherein the dimension is one or more of, width and length of the asperity.

4. The transducer head of claim 1, wherein the asperity sensor operates independently of the read element.

5. The transducer head of claim 1, wherein the temperature change at the asperity sensor causes a resistance value of the asperity sensor to change.

6. The transducer head of claim 1, wherein a voltage change across the asperity sensor indicates detection of the dimension of the asperity.

7. The transducer head of claim 1, wherein the asperity sensor includes a material with a temperature coefficient of resistance greater than about 0.002% per degree Celsius.

8. The transducer head of claim 1, wherein the asperity sensor includes NiFe.

9. The transducer head of claim 1, wherein the asperity sensor detects a void in the storage media using a temperature increase at the asperity temperature.

10. The transducer head of claim 1, wherein the asperity is a protrusion on the storage media and the asperity sensor detects a temperature decrease due to convective cooling.

11. The transducer head of claim 1, wherein the asperity sensor characterizes the detected asperity as one of protruding from the storage media and recessed into the storage media based on a dominant response of the temperature change at the asperity sensor.

12. An asperity detection system comprising:
    a temperature-dependent resistive asperity sensor that detects a temperature change caused by convective heat transfer; and
    a preamplifier that correlates a resistance change at the asperity sensor to a dimension of an asperity on a surface of a storage media.

13. The asperity detection system of claim 12, wherein the asperity includes one or both of a void in the surface of the storage media and a protrusion from the surface of the storage media.

14. The asperity detection system of claim 12, wherein the dimension is one or more of width and length of the asperity.

15. A method comprising:
    passing a transducer head over a storage media surface; and
    detecting a dimension of an asperity on the storage media surface using a temperature change at an asperity sensor on the transducer head, the temperature changed caused by convective heat transfer, wherein the asperity sensor operates independently of a read element on the transducer head.

16. The method of claim 15, further comprising:
    increasing fly height of the transducer head; and
    detecting the dimension of the asperity on the storage media surface at the increased fly height.

17. The method of claim 16, wherein the increasing and detecting operations are repeated iteratively until the asperity on the storage media surface is no longer detected.

18. The method of claim 17, further comprising:
    outputting a maximum fly height of the transducer head where the asperity is detected as a height dimension of the asperity.

19. The method of claim 16, wherein the increasing operation is accomplished by reducing heater power to the read element.

20. The method of claim 15, wherein the dimension is one or more of width and length of the asperity.

* * * * *